(12) United States Patent
Pellini

(10) Patent No.: US 6,401,910 B1
(45) Date of Patent: Jun. 11, 2002

(54) APPARATUS FOR CLEANING THE ORGAN CONVEYING PRODUCTS TO BE COOKED IN TUNNEL OVENS

(75) Inventor: Gaetano Pellini, San Giovanni Lupatoto (IT)

(73) Assignee: Tre P. Eng. S.r.l., Verona (IT)

( * ) Notice: Subject to any disclaimer, the term of this patent is extended or adjusted under 35 U.S.C. 154(b) by 27 days.

(21) Appl. No.: 09/611,002

(22) Filed: Jul. 6, 2000

(51) Int. Cl.[7] .............................................. B65G 45/00
(52) U.S. Cl. ........................................ 198/495; 15/302
(58) Field of Search ................................ 198/493, 494, 198/495; 15/302

(56) References Cited

U.S. PATENT DOCUMENTS

| | | | | |
|---|---|---|---|---|
| 2,266,309 A | * | 12/1941 | Cohen ......................... | 198/495 |
| 4,960,200 A | * | 10/1990 | Pierce ......................... | 198/495 |
| 5,333,724 A | * | 8/1994 | Wingfield et al. .......... | 298/495 |
| 5,355,992 A | * | 10/1994 | Baig et al. .................. | 198/495 |
| 5,446,942 A | * | 9/1995 | Whitehorn ................. | 15/309.2 |
| 5,783,044 A | * | 7/1998 | Schneider et al. .......... | 162/278 |
| 6,035,996 A | * | 3/2000 | Swift ........................ | 298/495 |
| 6,050,392 A | * | 4/2000 | Straub ....................... | 198/495 |
| 6,051,076 A | * | 4/2000 | Oeschle et al. ............. | 134/15 |
| 6,135,267 A | * | 10/2000 | Straub ....................... | 198/495 |
| 6,206,175 B1 | * | 3/2001 | Tschantz .................... | 198/493 |

* cited by examiner

Primary Examiner—Christopher P. Schwartz
Assistant Examiner—Benjamin A Pezzlo
(74) Attorney, Agent, or Firm—Browdy and Neimark

(57) ABSTRACT

An apparatus for cleaning a conveyor in tunnel ovens, the apparatus having a support frame able to be positioned in correspondence with a segment of the path of the conveyor, a plurality of nozzles positioned on the frame according to a line substantially transverse to the conveyor in such a way as to face at least a portion of the conveyor and a unit for feeding the nozzles with a washing fluid under pressure. The nozzles are mounted on a bridge able to translate from a first operative position to at least a second operative position according to a direction substantially transverse to the conveyor, in such a way as to cause the nozzles to face a new portions of the conveyor previously not hit by the jet of washing fluid.

18 Claims, 6 Drawing Sheets

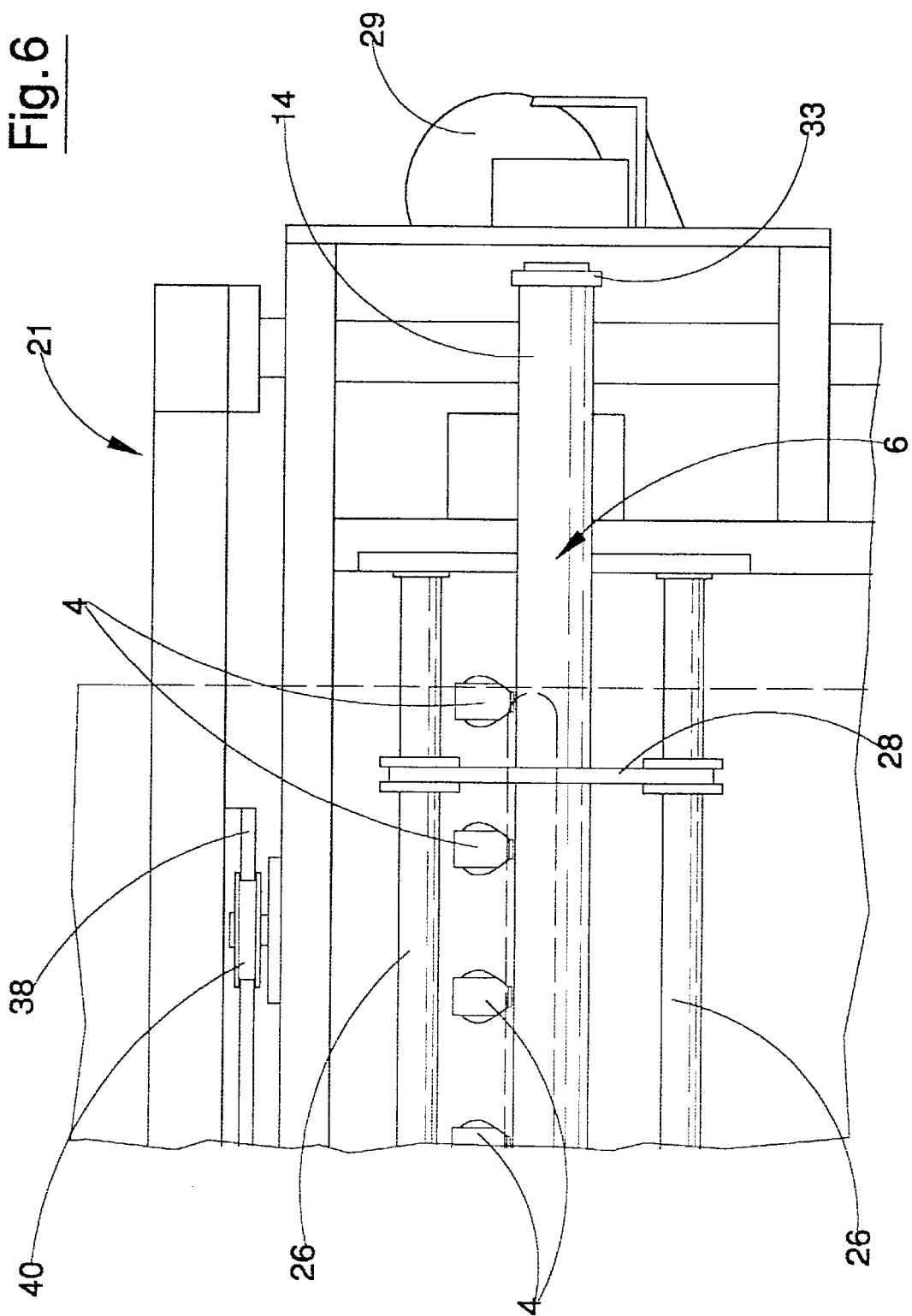

APPARATUS FOR CLEANING THE ORGAN CONVEYING PRODUCTS TO BE COOKED IN TUNNEL OVENS

BACKGROUND OF THE INVENTION

The present invention relates to an apparatus for cleaning the organ conveying products to be cooked in tunnel ovens. Such ovens are used in the industrial field to cook products of various kinds, for instance foodstuffs such as cookies or cakes. The oven usually comprises a cooking chamber inside which are located, in succession, regions at increasing temperature. The products to be cooked are made to pass inside the chamber by means of a conveyor organ which moves along a loop trajectory composed by a path inside the oven and a return route outside the oven.

The conveyor usually has a belt-like structure formed by a grid, in order to ensure that the lower part of the product is also cooked properly.

The requirement for a high production rate and the energy wastage encountered during the light-off and shut-down phases mean that for these ovens it is important to operate continuously, with very rare idle periods for maintenance.

A critical problem for the proper operation of these devices is represented by the cleanliness of the conveyor.

The products entering the oven, being raw, can easily leave residues on the conveyor. Since the latter is rotating, there is an accumulation of such residues which jeopardizes the success of the cooking operation. This material, in addition to "fouling" the raw products, can also fill the meshes of the grid constituting the conveyer, preventing the part of the product which rests thereon from cooking and the water contained in the product from evaporating.

The prior art provides for cleaning the moving conveyor by means of metal brushes mounted on rollers arranged transversely to the conveyor.

This solution, however, presents considerable drawbacks.

First of all, the brushes tend to get fouled with the same material which they are supposed to eliminate from the conveyor, with the consequent loss of cleaning effectiveness.

Secondly, the metal bristles, in their rotating motion, cannot clean all points in the grid. Thus, some material remains deposited on the sides of the grid meshes, in particular in correspondence with its nodes. When the material traverses the oven again, it hardens and irremovably binds the grid, enlarging the surface whereon new residues can be deposited. This chain process can lead to the complete clogging of the grid.

SUMMARY OF THE INVENTION

In light of the above description, the fundamental aim of the present invention is to provide an apparatus for cleaning the conveyor for tunnel ovens, able to solve the drawbacks listed above.

In particular, the technical task of the invention is to devise an apparatus which is not subject to loss of effectiveness due to contamination caused by the same material it has to remove.

A further aim of the invention is to obtain an apparatus which assures the total removal of the residues present on the conveyor.

The specified technical task and the aims set out above are substantially achieved by an apparatus for cleaning the conveyor in tunnel ovens as described in the accompanying claims.

BRIEF DESCRIPTION OF THE DRAWINGS

Purely by way of non limiting example, the description shall now be provided of a preferred but not exclusive embodiment of an apparatus according to the invention, illustrated in the accompanying drawings, in which:

FIG. 6 shows an enlarged detail of FIG. 3.

DESCRIPTION OF THE PREFERRED EMBODIMENTS

With reference to the aforementioned drawings, the apparatus according to the invention is globally indicated with the number 1.

The apparatus comprises a support frame 2 able to be positioned in correspondence with a segment of the path of a belt-like conveyor organ 3 constituted by a continuous grid wound in a loop and movable inside a tunnel oven.

Advantageously, the frame 2 is located on a segment of the return path of the conveyor 3 external to the oven, so that the apparatus does not have to operate on the conveyor when it is at high temperature.

Figure 1:
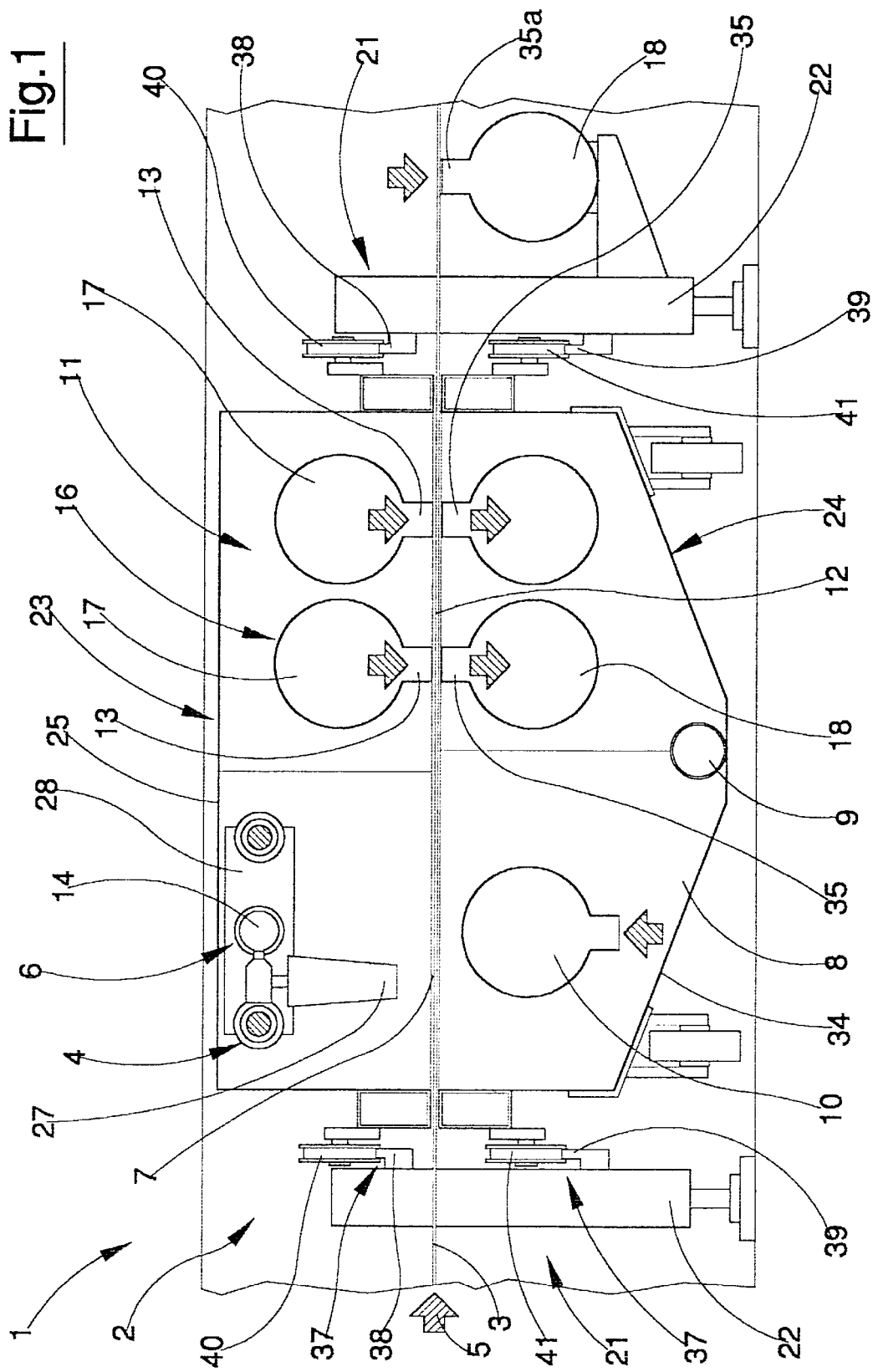
FIG. 1 shows a side view of the apparatus according to the invention.
Figure 3:
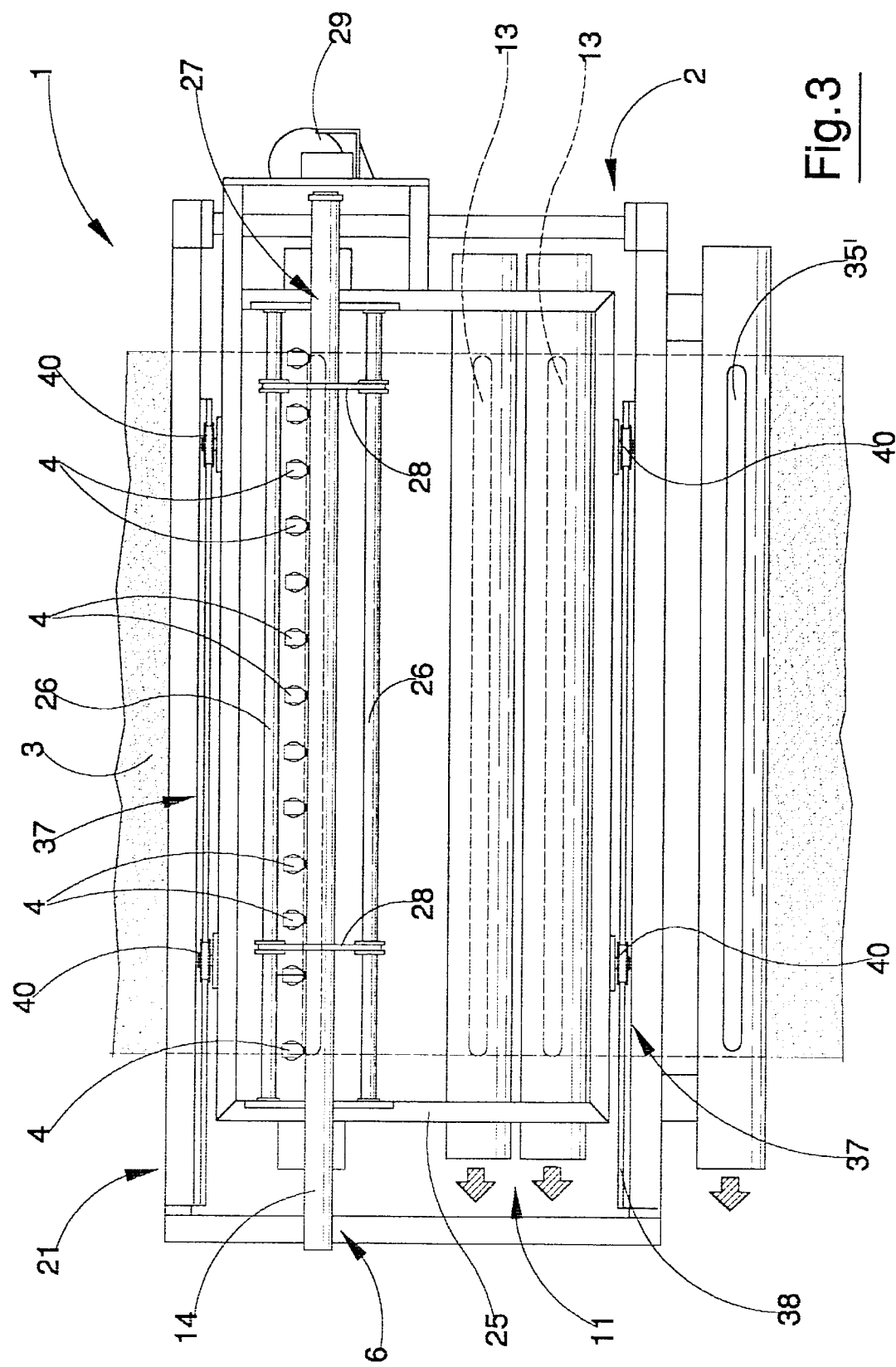
FIG. 3 shows a plan view of the apparatus of FIG. 1.

A portion of the conveyor 3 is shown in dashed lines in FIG. 3, whilst its direction of advance is shown by the arrow indicated With number 5 in FIG. 1.

At least a nozzle 4 is mounted on the frame 2 in such a way as to face at least a portion of the conveyor 3 in correspondence with a first segment 7 of its trajectory, as FIG. 3 clearly shows.

Advantageously the apparatus 1 comprises a plurality of said nozzles 4 positioned on the frame 2, above the conveyor 3, according to a line substantially transverse thereto.

Also present are means 6 for feeding the nozzles with a washing fluid under pressure. In this way said portion of the conveyor 3 can be hit by a jet of fluid and thereby be cleaned.

This fluid is preferably a liquid, for example water, whereto can be added additives to enhance its washing properties.

Figure 4:
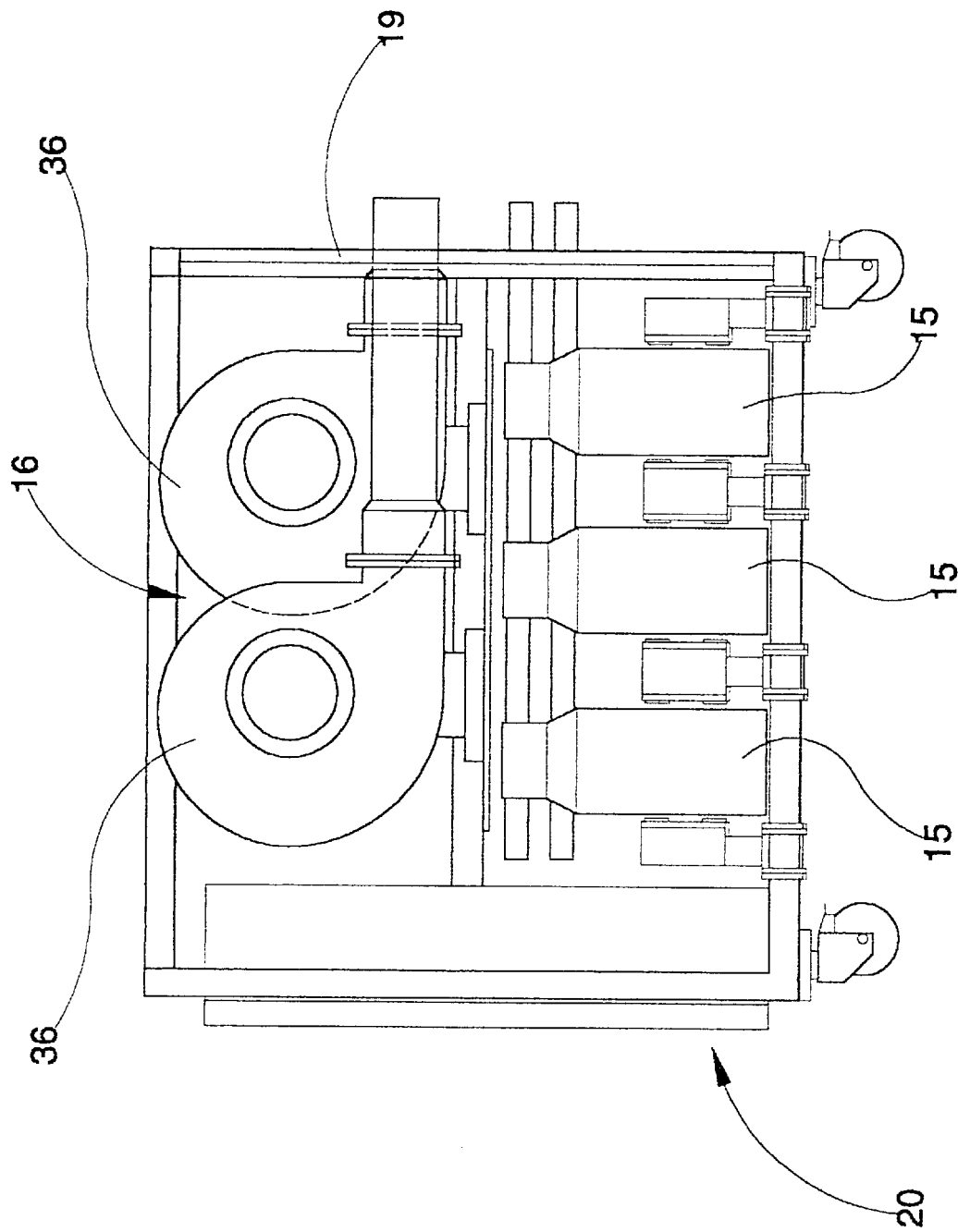
FIG. 4 shows the feeding assembly of the apparatus according to the invention.

The means 6 for feeding the nozzles comprise a feeding conduit 14 and at least a pump 15, shown in FIG. 4, operatively active on the conduit 14 to thrust pressurized fluid therein.

A collection tank, indicated with number 8 in FIG. 1, is positioned underneath the conveyor 3 in correspondence with the nozzles 4 to collect the washing fluid after it has hit the conveyor 3.

A discharge conduit 9 is then connected to the collection tank 8 to let the fluid flow out.

The spray generated by the liquid that hits the conveyor 3 at very high pressures makes the air of the space above the tank 8 rich in suspended liquid particles. For this reason an air aspirator 10 is operatively active inside the tank 8 to eliminate the liquid suspended in the air.

The apparatus further comprises means 11 for drying the conveyor 3 mounted on the frame 2 in such a way as to be operatively active on at least a portion of the transport 3 in correspondence with a second segment 12 of the trajectory of the conveyor 3 itself. This second segment 12 is traveled by the conveyor 3 subsequently to the first segment 7, so that each portion of conveyor 3 washed in correspondence with the first segment 7 is subsequently dried in correspondence with the second segment 12.

The means 11 for drying the conveyor comprise at least a blowing outlet 13 positioned above the conveyor 3 and at least an aspiration inlet 35 located below the conveyor 3. Outlet and inlet have elongated shape according to a direction of development substantially transverse to the conveyor 3.

To ensure the proper drying of the conveyor 3, it is particularly advantageous to position each blowing outlet 13 in correspondence with an aspiration inlet 35.

The embodiment described herein provides in particular for the use of a pair of blowing outlets 13 set side by side and positioned above a pair of aspiration inlets 35. A third aspiration inlet 35a is farther downstream on the path of the conveyor.

Pneumatic means 16 are provided for conveying air to the blowing outlets 13 and aspirate air from the aspiration inlets 35. These means 16 comprise at least a line 17 for the injection of air, connected to at least one of the blowing outlets 13, at least a line 18 for the extraction of air, connected to at least one of the aspiration inlets 35, and one or more fans 36 active on the air lines.

The fans 36, preferably two in number, are housed outside the frame 2 in a feeding assembly 20. The latter is constituted by a carriage 19 whereon are also housed the pumps 15 that feed the nozzles 4 (see FIG. 4).

In detail, the frame 2 comprises a support base 21, an upper portion 23 and a lower portion 24.

The support base 21 has a rectangular plan form and rests on the ground by means of four legs 22.

The upper portion 23 comprises a first box body 25 positioned above the conveyor 3. On this body 25 are mounted the blowing outlets 13 and a segment of the related air injection lines 17.

The same box body 25 also encloses a pair of beams 26 (shown in FIG. 3) which extend transversely to the conveyor 3.

To the beams 26 is translatably fastened a bridge 27 whereon the nozzles 4 are mounted. The bridge 27 is able to translate from a first operative position to at least a second operative position according to a direction substantially transverse to the conveyor 3, so that the jet of fluid emitted by the nozzles 4 can hit a portion of the conveyor 3 which previously had not been involved by the jet.

In particular the bridge 27 comprises a pair of cross members 28, each of which is translatably connected to the extremities of the two beams 26. On the cross members is integrally mounted the feeding conduit 14 which in turn supports the nozzles 4.

Figure 2:
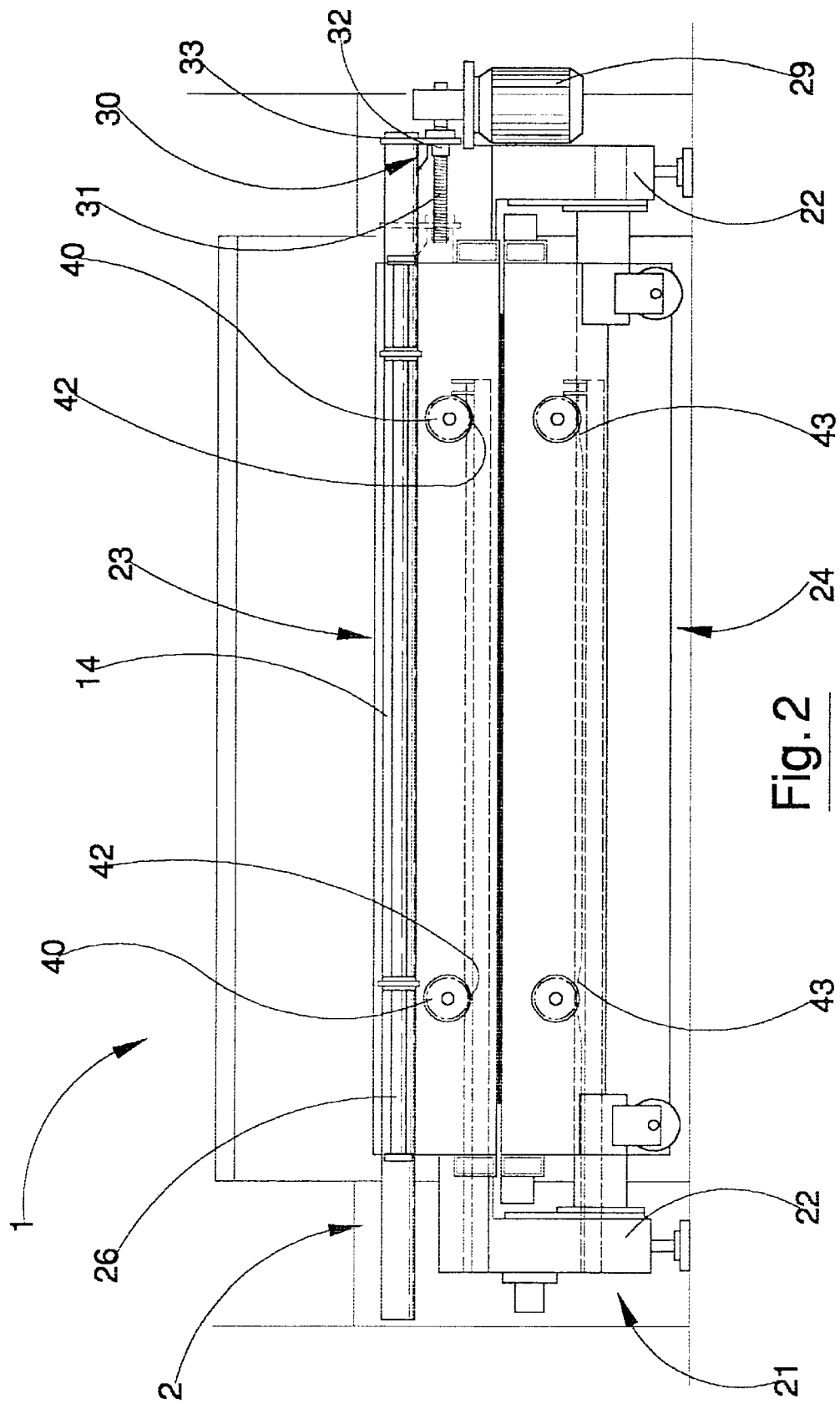
FIG. 2 shows a front view of the apparatus of FIG. 1.

Actuation of the bridge 27 is provided by a motor 29 (shown in FIGS. 2 and 5) mounted on the base 21 of the frame.

The motor is connected to the bridge through transmission means 30. The latter comprise a worm screw 31 exiting the motor 29, a threaded bushing 32 and the conduit 14. When the motor 29 is in motion, the screw 31 is made to rotate; the bushing 32 then transmits to the arm 33 a translating motion which, through the conduit 14, involves the entire bridge 27.

The lower portion 24 of the frame 2 comprises a second box body 34 which encloses the collection tank 8, the pair of aspiration inlets 35 and a segment of the related air extraction lines 18.

The apparatus according to the invention further comprises means 37 for separating the upper portion 23 from the lower portion 24 (shown in FIGS. 1 and 3).

These means 37 comprise a first pair of rails 38 mounted on the base 21 and a second pair of rails 39 mounted on the same base 21 below the first pair 38. Both rail pairs 38, 39 develop transversely to the conveyor 3.

The upper portion 23 of the frame is translatably mounted on the first pair of rails 38 by means of a first plurality of wheels 40, similarly, the lower portion 24 is translatably mounted on the second pair of rails 39 by means of a second plurality of wheels 41.

The first pair of rails 38 has a longitudinal section that presents at least a depression 42, whilst the longitudinal section of the second pair of rails 39 presents has at least a hump 43.

Figure 5:
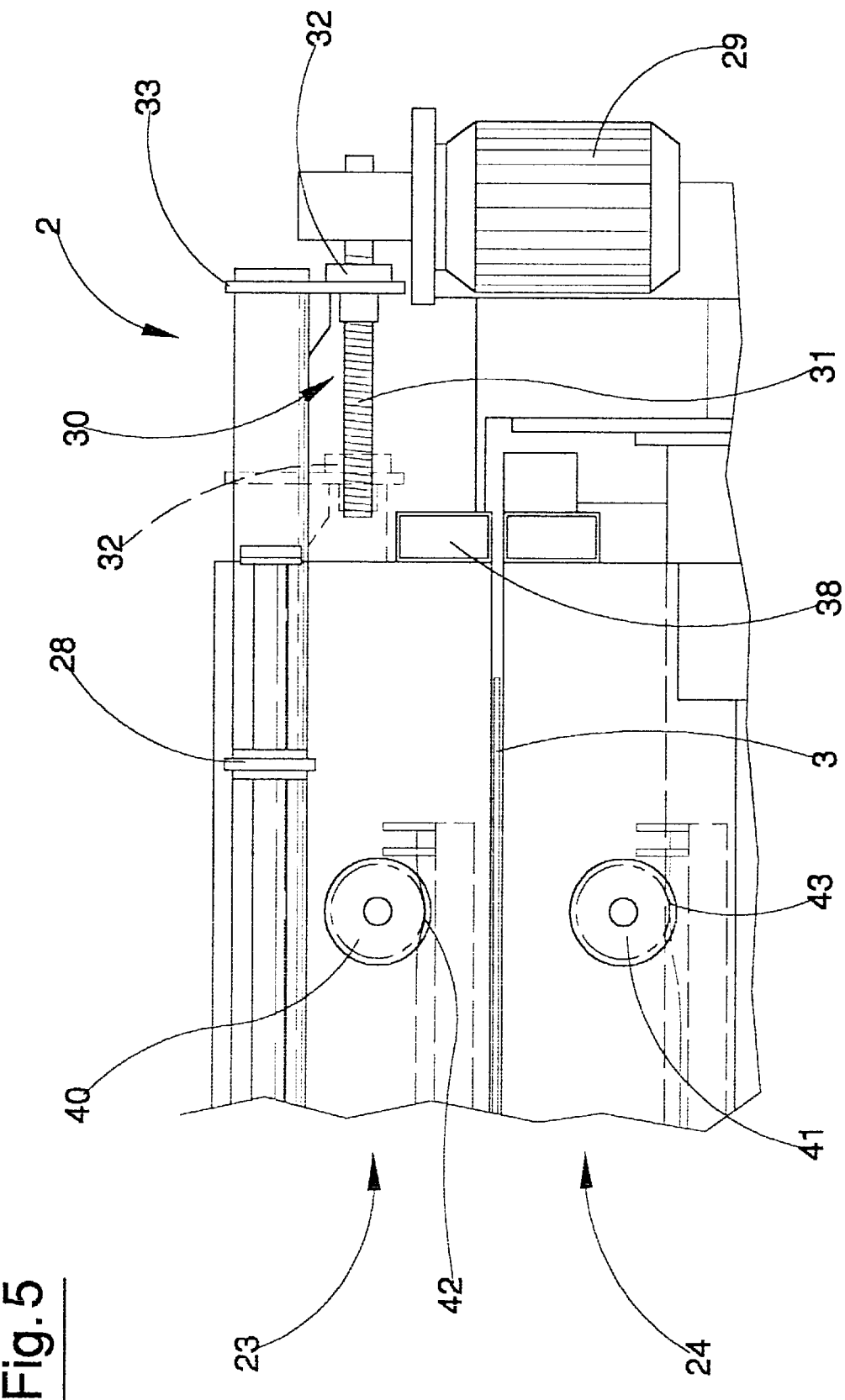
FIG. 5 shows an enlarged detail of FIG. 2.

This particular conformation of the rails 38, 39 allows to approach the upper and lower portion 23, 24 of the frame when the wheels 40 are in correspondence with the depressions 42 and the wheels 41 are in correspondence with the humps 43 (see FIG. 5).

In the same way, when it is necessary to access the internal part of the apparatus for maintenance operations, the two portions 23, 24 of the frame can be moved away from one another.

It is sufficient to let at least a portion 23 24 of the frame slide on the respective rails 38, 39, thereby making the wheels 40 that support the upper portion 23 exit the depressions 42 and/or making the wheels 41 supporting the lower portion descend from the humps 43.

The operation of the apparatus, described above in mainly structural terms, is as follows.

The conveyor organ slides, in the direction indicated by the arrow 5, between the upper portion 23 and the lower portion 24 of the frame 2.

When the conveyor 3 needs to be cleaned, the means 6 for feeding the nozzles are activated. Under these conditions a jet of washing fluid exits each nozzle 4 under very high pressures (for instance from 60 bar to over 250 bar) and hits the underlying portion of the conveyor 3.

It should be noted that each nozzle 4 emits a jet of lesser amplitude than the distance between the nozzles themselves.

When it passes under the nozzles 4, the conveyor is therefore not washed along its entire transverse development. Exiting the apparatus 1, the conveyor 3 shall therefore have longitudinal strips that are washed side by side with longitudinal strips that are yet to be cleaned.

Once the conveyor 3 has completed a whole circuit of its loop trajectory, and has thus passed in its entire longitudinal development a first time underneath the nozzles 4, the motor 29 makes the bridge 27 move in a direction transverse to the conveyor 3.

After this initial displacement, the nozzles 4 will face a new portion of the conveyor 3, which has not been previously reached by the washing fluid. At the end of another circuit of the conveyor 3 a new series of longitudinal portion of conveyor 3 will have been washed. The bridge 27 shall then effect a second displacement to position the nozzles on new portions of the conveyor 3 to be cleaned.

These operations are repeated the number of times required to clean the conveyor 3 in all its development.

Each portion of conveyor 3, after being cleaned by the washing fluid, is dried in correspondence with the blowing outlets 13 and aspiration inlets 35.

The washing fluid is instead collected in the tank 8 and made to flow out by means of the conduit 9.

The invention achieves important advantages.

First of all, the apparatus is not subject to losses of effectiveness due to contamination caused by the same material to be removed. There are no mechanical parts in direct contact with the fouled conveyor 3; the removed material is completely evacuated outside the apparatus by means of the same fluid, which flows out of the conduit 9.

An important advantage of the apparatus according to the invention is that of assuring the total removal of the residues present on the conveyor 3. The high pressure fluid jet is able adequately to clean all the regions of the conveyor, including those regions, such as the nodes of the grid stricture of the conveyor 3, which would be hard to reach with mechanical means.

What is claimed is:

1. An apparatus for cleaning a conveyor that conveys products to be cooked in tunnel ovens, where said conveyor moves along a trajectory of advancement, comprising:

a support frame able to be positioned in correspondence with a first segment of the trajectory of the conveyor;

a bridge mounted on said frame;

a plurality of nozzles mounted on the bridge according to a line substantially transverse to said trajectory of advancement of the conveyor, and in such a way that each nozzle faces at least a portion of the conveyor in correspondence with a first segment of the trajectory of the same conveyor;

means for feeding said nozzles with a washing fluid under pressure in such a way that said portion of the conveyor facing the nozzles is hit by a jet of the washing fluid; and a motor mounted on the frame and connected to the bridge to move the bridge from a first operative position to at least a second operative position according to a direction substantially transverse to said trajectory of advance of the conveyor, in such a way as to cause said nozzles to face a new portion of the conveyor previously not involved by the jet of washing fluid.

2. An apparatus as claimed in claim 1, wherein said washing fluid is a liquid.

3. An apparatus as claimed in claim 1, wherein the nozzles are positioned above the conveyor.

4. An apparatus as claimed in claim 1, comprising:

a tank for collecting the liquid positioned underneath the conveyor in correspondence with the nozzles; and a discharge conduit connected to the collection tank.

5. An apparatus as claimed in claim 4, comprising an air aspirator operatively active inside the collection tank to eliminate the liquid suspended in the air.

6. An apparatus as claimed in claim 1, comprising means for drying the conveyor mounted on the frame and operatively active on at least a portion of conveyor in correspondence with a second segment of the trajectory of the conveyor itself, said second segment being traveled by the conveyor subsequently to the first segment.

7. An apparatus as claimed in claim 6, wherein the means for drying the conveyor comprise:

at least a blowing outlet positioned above the conveyor;

at least an aspiration inlet positioned underneath the conveyor; and pneumatic means for conveying air to the blowing outlet and aspirating air from the aspiration inlet.

8. An apparatus as claimed in claim 7, wherein said outlet and inlet have elongated conformation according to a direction of development substantially transverse to the conveyor.

9. An apparatus as claimed in claim 7, wherein each blowing outlet is positioned in correspondence with one of said aspiration inlets.

10. An apparatus as claimed in claim 1, wherein the means for feeding the nozzle with a washing fluid under pressure comprise a conduit for feeding the nozzle and at least a pump operatively active on said conduit.

11. An apparatus as claimed in claim 7, wherein the pneumatic means comprise at least an air injection line connected to at least one of the blowing outlets, at least an air extraction line connected to at least one of the aspiration inlets and at least a fan active on at least an air line.

12. An apparatus as claimed in claim 10, comprising a movable carriage bearing said pump.

13. An apparatus as claimed in claim 11, comprising a movable carriage bearing said fan.

14. An apparatus as claimed in claim 1, wherein said frame comprises a support base, an upper portion whereon is mounted said bridge, a lower portion and means for separating the upper portion from the lower portion.

15. An apparatus as claimed in claim 14, wherein said separating means comprise a first pair of rails mounted on said support base and a second pair of rails mounted on said support base underneath said first pair of rails, said upper portion of the frame being translatably mounted on said first pair of rails by means of a first plurality of wheels, said lower portion of the frame being translatably mounted on said second pair of rails by means of a second plurality of wheels.

16. An apparatus as claimed in claim 15, wherein the first pair of rails has a longitudinal section presenting at least a depression to cause the upper portion to approach the lower portion.

17. An apparatus as claimed in claim 15, wherein the second pair of rails has a longitudinal section presenting at least a hump to cause the lower portion to approach the upper portion of the frame.

18. An apparatus as claimed in claim 8, wherein each blowing outlet is positioned in correspondence with one of said inlets.

* * * * *